United States Patent [19]
Winkler

[11] 3,765,754
[45] Oct. 16, 1973

[54] MOTION PICTURE CAMERA
[75] Inventor: Alfred Winkler, Munich, Germany
[73] Assignee: AGFA Gevaert Aktiengesellschaft, Leverkusen, Germany
[22] Filed: July 25, 1972
[21] Appl. No.: 275,075

[30] Foreign Application Priority Data
July 27, 1971 Germany................... P 21 37 599.5

[52] U.S. Cl...................................... 352/90, 95/1.1
[51] Int. Cl. ........................................... G03b 21/32
[58] Field of Search ..................... 352/90, 93; 95/1.1

[56] References Cited
UNITED STATES PATENTS
3,649,111   3/1972   Miyoshi ............................... 352/90
3,057,251   10/1962  Mahn.............................. 352/141 X
1,995,252   3/1935   Keinert....................................352/90

Primary Examiner—Monroe H. Hayes
Attorney—Michael S. Striker

[57] ABSTRACT

A motion picture camera which has light-admitting openings in the front and bottom walls of its housing. The front opening admits a main light beam which passes through spaced-apart front and rear portions of the picture taking lens. A mirrored rotary shutter can deflect incoming light into a viewfinder or against the photosensitive element of an exposure control. The bottom opening can admit an auxiliary light beam against a first mirror which is movable into and from the path of the main light beam, and a second mirror is mounted on the bottom wall for movement to and from an open position in which it directs the auxiliary light beam against the first mirror. The first mirror is moved into the path of the main light beam in response to movement of the second mirror to the open position. If the first mirror transmits a portion of the main light beam, the foremost film frame can be exposed to light entering by way of both openings when the second mirror assumes its open position.

11 Claims, 1 Drawing Figure

PATENTED OCT 16 1973    3,765,754
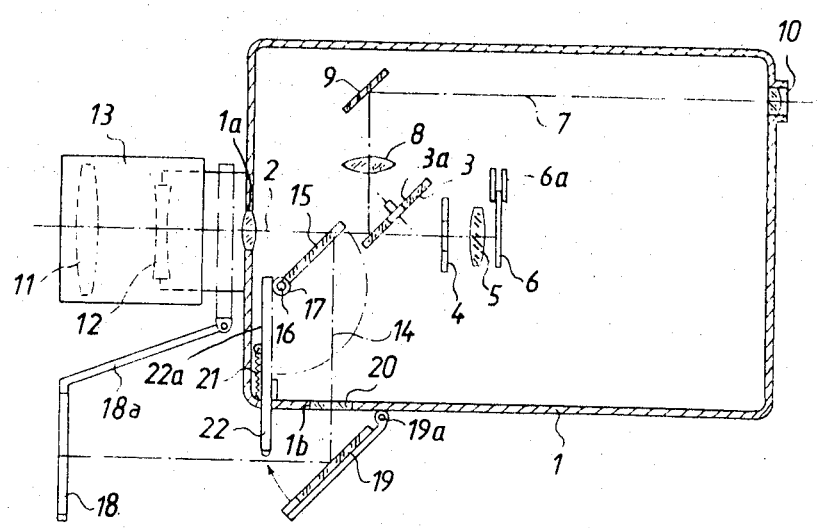

3,765,754

MOTION PICTURE CAMERA

BACKGROUND OF THE INVENTION

The present invention relates to photographic apparatus in general, especially to motion picture cameras, and more particularly to improvements in photographic apparatus of the type having two optical systems for admission of two discrete light beams.

SUMMARY OF THE INVENTION

An object of the invention is to provide a photographic apparatus wherein the frames of photographic film can be exposed to scene light and/or to an auxiliary light beam and whose optical systems are simpler, more compact and less expensive than those which are used in similar photographic apparatus of presently known design.

Another object of the invention is to provide a motion picture camera with a novel and improved auxiliary optical system which enables the user to superimpose upon the image of a subject or scene the image of a suitable text, photograph or another selected object or to expose the selected object without simultaneous exposure of one or more film frames to light coming from the viewed scene or subject.

A further object of the invention is to provide a motion picture camera with an auxiliary optical system which can be moved to or from an operative position at the will of the user while the user observes the scene or subject and which cooperates with the parts of the main optical system to focus the image of an object on an unexposed film frame as well as to allow the observation of a selected object in the viewfinder.

The invention resides in the provision of a photographic apparatus, especially a motion picture camera for use with 8-millimeter film, which comprises a housing having first and second light-admitting openings which can be respectively provided in the front and bottom walls of the housing, a first optical system including a picture taking lens registering with the first opening and having a front portion located in front and a rear portion located behind the first opening, guide means disposed behind the rear portion of the picture taking lens and serving to guide motion picture film so as to allow for the placing of successive film frames into register with the rear portion of the lens, and a second optical system including an optical element (which preferably constitutes a partly or fully light-reflecting mirror) movable in the housing between first and second positions in one of which the optical element is located between the front and rear portions of the lens to deflect into the rear portion of the lens at least a part of light which is admitted by way of the second opening. The optical element can be mounted for pivotal or reciprocatory movement between its first and second positions.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic longitudinal vertical sectional view of a motion picture camera which embodies the invention.

DESCRIPTION OF THE PREFERRED EMBODIMENTS

The drawing illustrates the housing 1 of a motion picture camera which accommodates a rotary shutter 3 having at its front surface a composite mirror 3a which can deflect incoming light into a viewfinder including an objective lens 8, a deflecting mirror 9 and an eyepiece 10. The incoming main beam of scene light is shown at 2; this light beam is admitted by way of a picture taking lens which includes a rear portion consisting of an optical element 5 located behind the shutter 3 and a front portion 13 which includes the optical elements 11 and 12. The portions 5 and 13 of the picture taking lens register with and are respectively located behind and in front of an opening 1a in the front wall of the housing 1. An adjustable diaphragm 4 is located between the optical element 5 and shutter 3 in a plane which is shown as being normal to the light beam 2. The reference character 6 denotes a portion of 8-millimeter motion picture film which is guided behind the optical element 5 by a film guide 6a. The mechanism for transporting the film 6 lengthwise is of conventional design and is not shown in the drawing. The shutter 3 comprises sectors which carry the sections of the mirror 3a so that the light beam 2 is deflected into the viewfinder when not allowed to impinge on the foremost unexposed frame of the film 6. The light beam which is deflected into the viewfinder is shown at 7.

The camera further comprises a second or auxiliary optical system which can admit an auxiliary light beam 14. This auxiliary optical system comprises an optical element here shown as a mirror 15 which is mounted in the housing 1 for movement about the axis of a fixed pivot 16 and can assume either one of two positions including the illustrated first or operative position in which it deflects at least a portion of the auxiliary light beam 14 into the optical element 5 and a second position in which it does not interfere with the passage of main light beam 2 from the optical element 12 toward the optical element 5. The auxiliary optical system further includes a deflecting mirror 19 which is attached to the bottom wall of the housing 1 by a hinge 19a and serves to direct the incoming auxiliary light beam 14 against the mirror 15 when it assumes the illustrated open or light-admitting position. The mirror 15 deflects light against the mirror 3a which in turn directs light into the viewfinder 8 – 10. The housing 1 has a second light-admitting opening 1b which is provided in the bottom wall and admits the light beam 14 when the mirror 19 is caused or allowed to assume the illustrated open position. When the mirror 15 assumes the position which is shown in the drawing, it deflects light against the mirror 3a which in turn directs light into the viewfinder 8–10. The opening 1b contains a flat light-transmitting plate 20 to prevent entry of dust. A frame 18a which is preferably detachably mounted on the front portion 13 of the picture taking lens can serve as a holder for a photograph 18 or a title card (not shown) which is removably inserted into the frame 18a so that its image can be reflected onto the foremost unexposed frame of the film 6 upon movement of the mirror 19 to the illustrated open position.

The housing 1 further accommodates a coupling or motion transmitting member 22 which can cause the mirror 15 to direct at least a portion of the auxiliary light beam 14 against the optical element 5 in response to movement of the mirror 19 to the illustrated open position. The member 22 is a reciprocable rod a portion of which constitutes a toothed rack 22a meshing with a pinion 17 on the pivot 16 for the mirror 15. A helical spring 21 biases the member 22 downwardly, as viewed in the drawing, whereby the rack 22a rotates the pinion 17 and causes the mirror 15 to assume its operative position. When the mirror 19 is pivoted clockwise toward the plate 20, it engages and depresses the member 22 whereby the mirror 15 pivots clockwise and moves out of the path of the light beam 2. A suitable catch or analogous retaining means (not shown) can be provided on the housing 1 to releasably hold the mirror 19 in its closed position in which the opening 1b is sealed against entry of light.

The mirror 15 can be a fully or partly light reflecting mirror. If the mirror transmits some light, it allows a portion of the main light beam 2 to reach the foremost film frame simultaneously with deflected portion of the auxiliary light beam 14. The foremost film frame is then exposed to some of the scene light (portion of the beam 2) and to some light which passes through or is reflected by the photograph 18 or title card in the frame 18a. If the mirror 15 does not transmit light, it interrupts the main light beam 2 as soon as the mirror 19 assumes the illustrated open position so that the foremost film frame records only the image of the object in the frame 18a. The user of the camera can see the image of the object 18 and/or the image of the subject in front of the optical element 11 by looking into the eyepiece 10 of the viewfinder.

If desired, the mirror 15 can be mounted for reciprocatory (rather than pivotal) movement between its first and second positions. The parts 16, 17, 22a are then replaced by a carriage which can be secured to the motion transmitting member 22 to move therewith under or against the action of the spring 21 or analogous biasing means.

It will be noted that the mirror 3a is closely adjacent to the plane of the diaphragm 4 and that the mirror 15 can be moved into the path of the main light beam 2 between the mirror 3a and the opening 1a, i.e., between the mirror 3a and the front portion 13 of the picture taking lens.

The mirrors 15 and 3a cooperate to direct the image of the object 18 into the viewfinder in an upright position. In addition to or instead of directing the light beam 2 and/or 14 into the viewfinder, the mirror 3a can serve to direct light against the photosensitive element of an exposure control, not shown.

When the shutter 3 is at a standstill, the mirror 3a blocks the entry of light into the aperture of the diaphragm 4. When the shutter 3 rotates about its axis, its transparent portion transmits light into the aperture of the diaphragm 4 while the film 6 is at a standstill and the mirror 3a deflects light into the viewfinder 8–10 during transport of the film 6. Thus, the incoming light alternately reaches the film 6 and is directed into the view finder as long as the shutter rotates.

The mirrors 15 and 19 are preferably spherical mirrors which act as a "front lens attachment" for the optical element 5 which is set for infinity so that the element 5 is focussed on the object 18.

Without further analysis, the foregoing will so fully reveal the gist of the present invention that others can by applying current knowledge, readily adapt it for various applications without omitting features which fairly constitute essential characteristics of the generic and specific aspects of my contribution to the art, and therefore, such adaptations should and are intended to be comprehended within the meaning and range of equivalence of the claims.

What is claimed as new and desired to be protected by Letters Patent is set forth in the appended

1. In a photographic apparatus, particularly in a motion picture camera, a combination comprising a housing having first and second light-admitting openings; a first optical system including a picture taking lens registering with said first opening and having a front portion and a rear portion, said rear portion being disposed behind and being spaced apart from said front portion; guide means located behind said rear portion of said picture taking lens and arranged to guide photographic film so as to allow for the placing of successive film frames into register with said rear portion of said picture taking lens; and a second optical system including an optical element movable in said housing between first and second positions in one of which said optical element is located between said front and rear portions of said picture taking lens and deflects into said rear portion at least a part of light which is admitted by way of said second opening while simultaneously intercepting at least a part of light which is admitted by way of said first opening.

2. A combination as defined in claim 1, wherein said optical element is a mirror which is pivotable between said first and second positions thereof.

3. A combination as defined in claim 1 wherein said optical element is a mirror which is reciprocable between said first and second positions thereof.

4. A combination as defined in claim 1 wherein said optical element is a partly light-reflecting mirror which in said one position thereof deflects against said rear portion a first part of light entering by way of said second opening and transmits a second part of such light, and further comprising viewfinder means positioned in said housing to receive at least one of said first and second parts of light.

5. A combination as defined in claim 1, further comprising viewfinder means mounted in said housing and deflecting means for directing light entering by way of said first opening into said viewfinder means, said deflecting means being disposed in said housing between said front and rear portions of said picture taking lens, said optical element being located in said one position thereof between said deflecting means and one portion of said picture taking lens.

6. A combination as defined in claim 5, further comprising diaphragm means provided in said housing between said portions of said picture taking lens.

7. A combination as defined in claim 5, wherein said deflecting means comprises a mirror which is movable into and out of the path of light entering said housing by way of said second opening and being deflected by said optical element toward said rear portion.

8. A combination as defined in claim 5, wherein said deflecting means constitutes an optical correcting means.

9. A combination as defined in claim 1, wherein said second optical system further comprises a mirror outwardly adjacent to said second opening and movable between a first position in which said mirror directs light against said optical element by way of said second opening and a second position in which said mirror prevents entry of light by way of said second opening.

10. A combination as defined in claim 9, further comprising motion transmitting means for moving said optical element to said one position in response to movement of said mirror to said first position.

11. A combination as defined in claim 1, further comprising a flat light-transmitting plate provided in said second opening.

* * * * *